(12) United States Patent
Becker et al.

(10) Patent No.: US 7,041,024 B2
(45) Date of Patent: May 9, 2006

(54) STEP DOWN GEAR TRAIN, MORE SPECIFICALLY FOR AN ADJUSTING DEVICE OF A MOTOR VEHICLE SEAT

(75) Inventors: Burckhard Becker, Solingen (DE); Van-Toan Ho, Frechen (DE); Reinhard Vogel, Erkrath (DE)

(73) Assignee: C. Rob Hammerstein GmbH & Co. KG, (DE)

( * ) Notice: Subject to any disclaimer, the term of this patent is extended or adjusted under 35 U.S.C. 154(b) by 134 days.

(21) Appl. No.: 10/865,387

(22) Filed: Jun. 10, 2004

(65) Prior Publication Data
US 2004/0254041 A1    Dec. 16, 2004

(30) Foreign Application Priority Data
Jun. 12, 2003    (DE) .................................. 103 27 103

(51) Int. Cl.
*F16H 1/32*    (2006.01)
(52) U.S. Cl. ..................................... 475/162
(58) Field of Classification Search ................ 475/149, 475/162, 177; 297/367
See application file for complete search history.

(56) References Cited

U.S. PATENT DOCUMENTS 4,379,976 A  *  4/1983  Pitchford et al. ............. 310/83
6,543,850 B1    4/2003  Becker et al.

* cited by examiner

Primary Examiner—Dirk Wright
(74) Attorney, Agent, or Firm—Cantor Colburn LLP

(57) ABSTRACT

A step down gear train, more specifically for an adjusting device of a motor vehicle seat, comprising an output shaft (22) rotating about an output axis (34), a pinion (20) that is connected to the output shaft (22), a housing (24) that comprises a housing portion (26) which is located in immediate proximity to the pinion (20) and has a passageway (28) for the output shaft (22), a first fixed gear wheel having external teeth that is connected to the housing portion (26) and comprises a bearing hole (32) which is centered on the output axis (34), a second gear wheel having external teeth that is connected to the pinion (20) and comprises a bearing protrusion (38) which is adapted to mate with the bearing hole (32), a cam gear (39) having internal teeth that meshes with both the first and the second gear wheel (30, 36), that has a gear axis which is offset an eccentricity value e relative to the output axis (34), that has a bearing hole (44) which is adapted to mate with the output shaft (22) and has the same axis as the output shaft (22) and an input shaft (52) that is in direct or indirect rotating communication with the cam gear (39).

11 Claims, 3 Drawing Sheets

Figure 1:
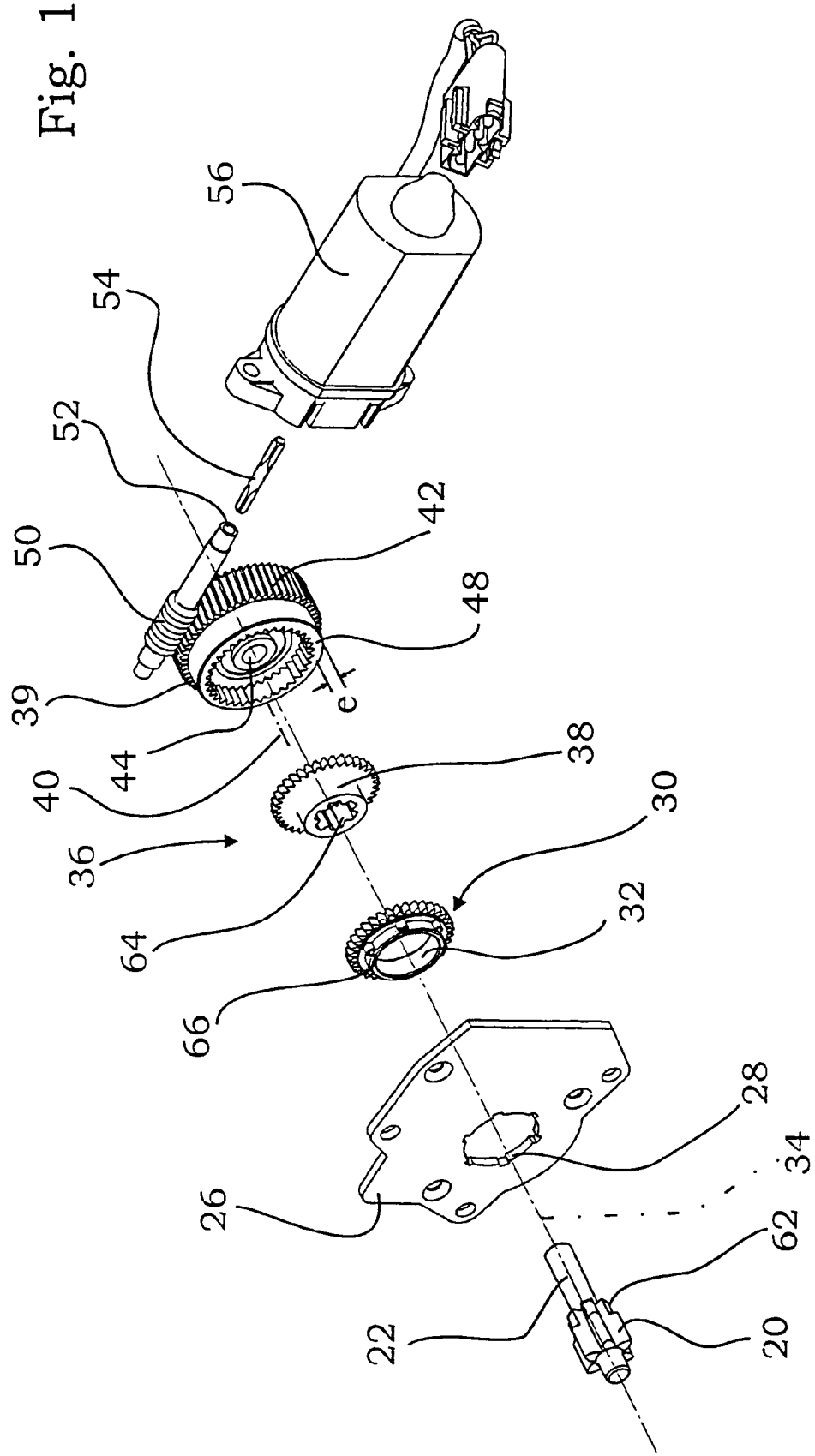

STEP DOWN GEAR TRAIN, MORE SPECIFICALLY FOR AN ADJUSTING DEVICE OF A MOTOR VEHICLE SEAT

The invention relates to a step down gear train that is particularly suited for an adjusting device of a motor vehicle seat. It is provided, in a well known manner, with an output shaft that rotates about an output axis. A pinion is connected to the output shaft and is typically meshing a toothed part of the adjusting device, such as a sector gear for example. A housing accommodates the various gear portions, the housing has a housing portion that is located in immediate proximity to the pinion and has a passageway for the output shaft. A first fixed gear wheel having external teeth is connected to said housing portion. A second gear wheel having external teeth is located in immediate proximity to said first gear wheel. As it is well known, it has a number of teeth that differs from the number of teeth of the first gear wheel by at least one. There is provided a cam gear having internal teeth that are in constant meshing engagement with both the first and the second gear wheel. Said cam gear wobbles about the output shaft, it has a gear axis that is offset an eccentricity value e relative to the output axis.

Step down gear trains of this type are often utilized in adjusting devices for motor vehicle seats. They have proved to be efficient. They form a nutating gear system. Such type gear train has a high gear reduction ratio. This is particularly advantageous in step down gear trains that are driven by means of an electric motor. As for prior art, reference is made to U.S. Pat. No. 6,543,850 B1.

A problem with the step down gear trains of this type is to achieve accuracy in manufacturing and zero clearance. Step down gear trains often utilized for adjusting devices are such in which the least possible clearance is to be provided in spite of longer lever arms, which are formed by the one and/or the other portion to be adjusted. An adjusting device for adjusting the inclination of the seat back will serve as an example. In this example, the seat back forms a relatively long lever, with no perceivable play of an adjusting device that is disposed in the lower region, that is to say in the region of the axis of the seat back, being allowed to be noticed at the upper edge of the seat back.

In view thereof, it is an object of the invention to indicate a step down gear train in which tolerances of the various component parts that are inevitably occurring during manufacturing will affect the gear train as a whole to the least possible extent and in which an output axis is associated with the greatest possible accuracy with the housing.

The solution to this object is achieved by a step down reduction gear train that is more specifically intended for use in an adjusting device of a motor vehicle seat, said gear train having an output shaft that rotates about an output axis, a pinion that is connected to the output shaft, a housing comprising a housing portion which is located in immediate proximity to the pinion and has a passageway for the output shaft, a first fixed gear wheel having external teeth that is connected to the housing portion and comprises a bearing hole that is centered on the output axis, a second gear wheel having external teeth that is connected to the pinion and comprises a bearing protrusion adapted to mate with the bearing hole, a cam gear having internal teeth that are in meshing engagement with both the first and the second gear wheel, said cam gear having a gear axis that is offset an eccentricity value e relative to the output axis and a bearing hole adapted to mate with the output shaft and having the same axis as the output shaft, and an input shaft that is in direct or indirect rotating communication with the cam gear.

On this step down gear train all of the rotating parts described herein above are disposed on, or associated with, the output shaft. The output shaft is carried precisely in the bearing that is formed between the bearing protrusion of the second gear wheel and the bearing hole of the first gear wheel. This bearing is located in immediate proximity to the housing portion in which the first gear wheel is also fixedly disposed, preferably within the passageway. The first gear wheel is either integrally formed as a part of the housing portion, with the teeth being for example stamped in said housing portion, or accurately connected to the housing portion. For this purpose, the first gear wheel has, in a developed implementation thereof, a fitting protrusion that is adapted to mate with the passageway and is preferably pressed into the passageway.

With its bearing protrusion, the second gear wheel engages the bearing hole of the first gear wheel. Preferably, said bearing hole has an axial length that is greater than the first gear wheel. This is the case if the first gear wheel has the fitting protrusion or is stamped in the material of the housing portion in such a manner that the bearing hole extends into the housing portion. As a result thereof, the second gear wheel is also immediately carried within the housing portion. If an implementation is chosen that differs from this preferred embodiment and if an axial offset is permitted, it will be small.

The cam gear has a gear axis that revolves in a circle around the output axis at a distance e. Each rotation of the cam gear causes the two gear wheels to rotate in opposite directions relative to each other to an extent dictated by the difference in the number of teeth.

The step down gear train comprises a very precise allocation of the housing portion, the two gear wheels and the cam gear to the output shaft with its pinion. A unit of very compact construction that is related to the housing portion is provided. All of the reaction forces are transmitted into the housing portion. The other portions of the housing, if at all necessary, are attached to the housing portion and will not affect the precision, they are purely passive.

In a particularly preferred developed implementation, the nutating gear system is mounted upstream of a gear reduction stage with worm and worm wheel. In the preferred embodiment, the cam gear is therefore connected to a worm wheel that is for its part centered on the output shaft. A worm, which is possibly driven by an electric motor via a flexible shaft, meshes with the worm wheel. Advantageously, the worm wheel is located radially outside of the cam gear.

The gear train in accordance with the invention has the advantage that the various component parts may be manufactured from different materials so that each of them may be made of the most appropriate material. On the just mentioned worm gear train, the worm may for example be manufactured by a sintering process and the worm gear be made of plastic material. The first and second gear wheels are preferably formed by sintering. In this case, the housing portion may be made of another material than for example sheet steel. It is preferred that the housing portion be a board-shaped part. It has holes or other connection regions for fixation onto a portion of an adjusting device.

The worm gear train typically permits to achieve a step-down ratio of about 47, the step-down ratio can be varied within a wide range and may for example be much lower, such as of 20, and much higher, such as of 60. The nutating gear system permits to achieve a step-up ratio of typically 25, which may also vary within a wide range of e.g., ±10, more specifically by choosing by how many the teeth will differ in number. As a result thereof, a step-down ratio of about 1,200 will be achieved.

Figure 2:
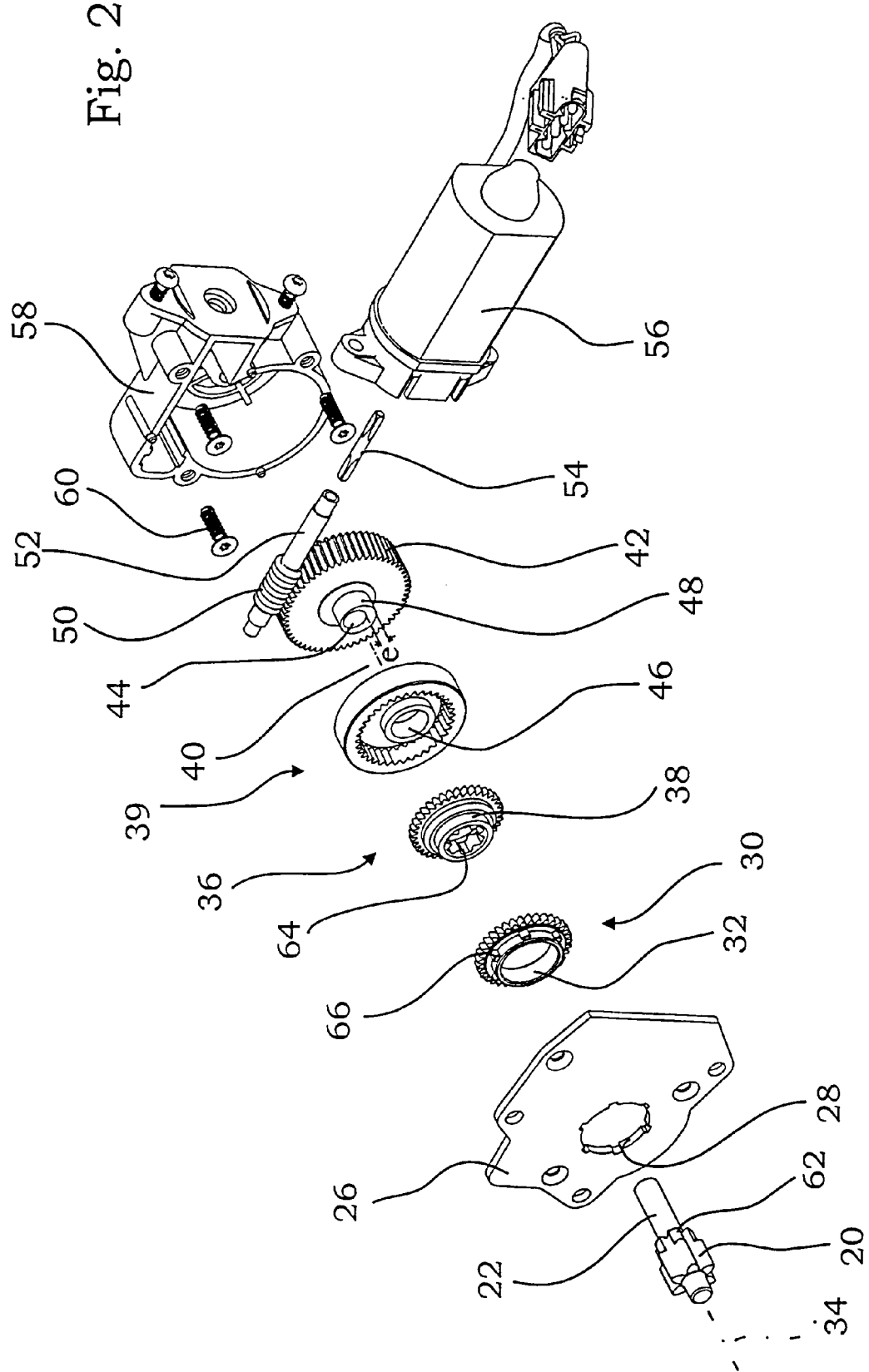
Figure 3:
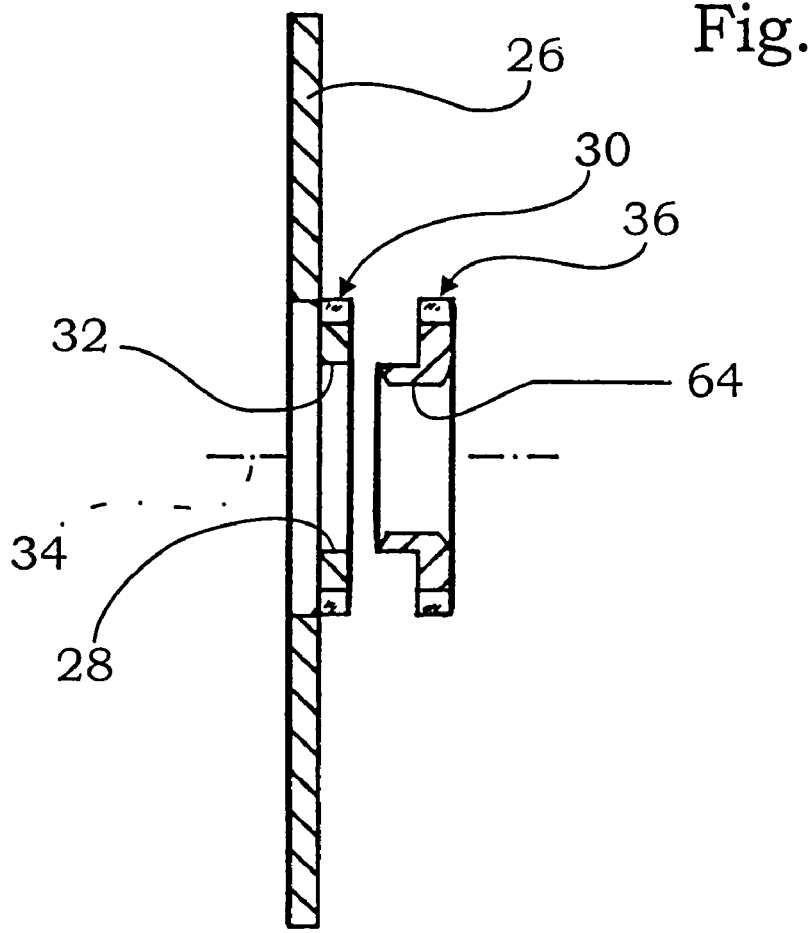
Figure 4:
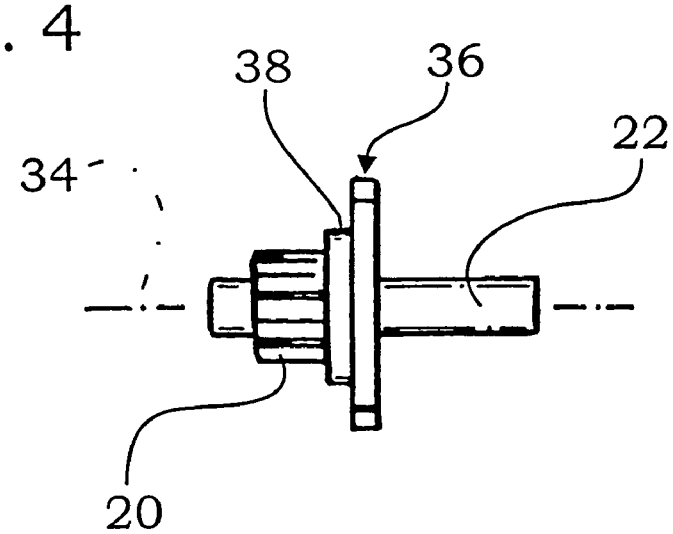

Further advantages and features of the invention will become more apparent from the other claims and from the following non restrictive description of embodiments thereof, given by way of example only with reference to the drawings. In the drawings:

FIG. 1 is a perspective view in the form of an assembly drawing of a step-down gear train with flexible shaft and driving electric motor, FIG. 2 is a perspective view similar to FIG. 1, but now with the remaining portion of the housing and separate component parts for a cam gear and for a worm gear, FIG. 3 is a sectional view of a housing portion with the first gear wheel and of a second gear wheel that is shown spaced therefrom and FIG. 4 is a perspective view of a portion with which the output shaft, the pinion and the second gear wheel with its bearing protrusion are integrally formed.

The step-down gear ratio shown in the Figs. is particularly suited and configured for use in an adjusting device of a motor vehicle seat. A pinion 20 is provided for this purpose, said pinion being connected to an output shaft 22 and rotating. It typically meshes with a toothed bar of a known adjusting device (not shown herein). Said toothed bar is adjusted relative to another portion, the other portion of the adjusting device is connected to the housing of the step down gear train, in this specific case with a housing portion 26 formed into a flat board made of sheet steel or of a similar material.

This housing portion 26 is located in immediate proximity to the pinion 20 and has a passageway 28 for the output shaft. This passageway will be discussed in greater detail herein after.

In immediate proximity and as far as possible at no distance from the housing portion, there is provided a first stationary gear wheel having external teeth. It is connected to the housing portion 26. It has a bearing hole 32 that is centered on an output axis 34 that forms the center of the output shaft 22.

In immediate contact with said first gear wheel 30 there is a second gear wheel 36 that also has external teeth. It has the same outer diameter as the first gear wheel 30. The second gear wheel 36 differs from the first gear wheel 30 in that the second gear wheel 36 has a total number of teeth that differs by at least one from the total number of teeth of the first gear wheel 30. As the two gear wheels 30, 36 have a multitude of teeth, e.g., 30 to 40 teeth, this difference in the number of teeth cannot be seen in the FIGS. 1 and 2. Preferably, the difference in the number of teeth is one, in this case a higher step down ratio of the gear train is also achieved with other differences.

The second gear wheel 36 has a bearing protrusion 38 that mates with the bearing hole 32; in the assembled condition, the bearing protrusion 38 engages with maximum fit into the bearing hole 32.

The two gear wheels 30 and 36 are surrounded by a cam gear 40. It has internal teeth and meshes with both the first and the second gear wheels 30 and 36. It has a wheel axis 40 that is offset an eccentricity value e relative to the output axis 34. The wheel axis 40 revolves on a circle about the output axis 34 which has the radius e.

While the pinion 20 with the output shaft 22, the housing portion 26 and the two gear wheels 30, 36 shown in the FIGS. 1 and 2 coincide, the two implementations differ with regard to the cam gear 39. This and further differences will be discussed herein after.

In the implementation of FIG. 1, the cam gear 39 is connected to, and integral with, a worm wheel 42. The cam gear 39 is made of metal, such as sintered metal whereas the worm wheel 42 is made of plastic. Preferably, the worm wheel 42 is directly integrally injection molded with the metal part.

The worm wheel 42 has a bearing hole 44 that is adapted to mate with the output shaft 22 for receiving the same. The bearing hole is located in a lug that projects toward the pinion 20 so as to be located within the cam gear 39 having internal teeth. As shown in FIG. 1, the worm wheel 42 is axially offset relative to the cam gear 39, their confronting borders lying in approximately the same radial plane. In an alternative, it is also possible to dispose the worm wheel 42 radially outside of the cam gear 39, meaning with no axial offset.

In the implementation of FIG. 2, cam gear 39 and worm wheel 42 are separate component parts. The cam gear 39 is a self-centered part. It has a seat 46 for a cam projection 48 protruding from the worm wheel 42. The bearing hole 44 for the output shaft 22 is located in this cam projection 49.

The cam projection 48 is off-centered with respect to the centered bearing hole 44, as best shown in FIG. 2.

In the further features that will now be discussed, the implementations of the FIGS. 1 and 2 are identical:

A worm 50 meshes with the worm wheel 42. Said worm is connected to an input shaft 52 that extends across the output shaft 22. The input shaft 52 is provided in a known manner with a polygonal socket into which engages a mating external polygonal fitting of a flexible shaft 54. Connection to an electric motor 56 is realized therethrough.

FIG. 2 shows a cover 58 that is part of the housing. It has a receiving surface for the electric motor 56 which may be secured by means of two screws that have been illustrated herein. It further has a passageway for the flexible shaft 54. Finally, the right free end of the output shaft 22 as shown in FIGS. 1 and 2 is journaled therein. Three screws 60 are provided by means of which the two portions of the housing, meaning housing portion 26 and cover 58 may be joined into a closed housing unit.

In principle, several individual parts of the gear train may be integrally joined together as this has already been explained herein above with respect to the difference between FIG. 1 and FIG. 2. The pinion 20, the output shaft 22 and the second gear wheel 36 with its bearing protrusion 38 may also be made from one piece, as best shown in FIG. 3. In the embodiment of FIGS. 1 and 2, pinion 20 and output shaft 22 are integrally joined together. Immediately behind the pinion there is provided a driver member 62 that extends as a continuation of the pinion with the tips of its teeth having been removed such as by cutting them off. A locating recess 64, which is provided in the second gear wheel 36, more specifically in the bearing protrusion 44 thereof, is associated with said driver member 62. Driver member 62 and locating recess 64 are solidly joined together such as by pressing or bonding them together. This embodiment makes it possible to have the second gear wheel 36 implemented as a sintered part whereas pinion 20, output shaft 22 and driver member 62 are each a normal metal or steel part.

In the FIGS. 1 and 2, the passageway 28 in the housing portion 26 is configured in a non-round shape. A fitting protrusion 66 of the first gear wheel 30 is shaped to exactly mate therewith and may be inserted therein. Housing portion 26 and first gear wheel 30 are solidly joined together. The center of the bearing hole is the reference point for the housing portion 26 and determines its allocation to the second gear wheel 36 and, as a result thereof, with the output shaft 22 as well.

FIG. 4 shows that the housing portion 26 and the first gear wheel 30 may be made from one piece. In this case it is not necessary to form a fitting protrusion on the first gear wheel 30. In the exemplary embodiment shown in FIG. 4, the first gear wheel 30 is stamped in a known manner in the flat sheet of iron. As a result thereof, the passageway 28 coincides with the bearing hole 32.

The invention claimed is:

1. A step down gear train for an adjusting device of a motor vehicle seat, comprising:
    an output shaft rotating about an output axis,
    a pinion connected to the output shaft,
    a housing comprising a housing portion which housing portion is located in immediate proximity to the pinion and has a passageway for the output shaft,
    a first fixed gear wheel having external teeth connected to the housing portion and comprising a bearing hole centered on the output axis,
    a second gear wheel having external teeth connected to the pinion and comprising a bearing protrusion adapted to mate with the bearing hole,
    a cam gear having internal teeth meshing with both the first and the second gear wheel, the cam gear further comprising a gear axis offset an eccentricity value e relative to the output axis, and a bearing hole adapted to mate with the output shaft which bearing hole has the same axis as the output shaft and
    an input shaft that is in direct or indirect rotating communication with the cam gear.

2. The step down gear train according to claim 1, wherein the cam gear is connected to a worm wheel, the worm wheel is centered on the output axis and a worm being provided, which worm is connected to the input shaft and meshes with the worm wheel.

3. The step down gear train according to claim 1, wherein the first gear wheel is connected to, and integral with, the housing portion.

4. The step down gear train according to claim 1, wherein the first gear wheel comprises a fitting protrusion, and the passageway of the housing portion is adapted to mate with the fitting protrusion for reception of the fitting protrusion.

5. The step down gear train according to claim 1, wherein the second gear wheel is connected to, and integral with, the output shaft.

6. The step down gear train according to claim 1, wherein the second gear wheel has a locating recess, a driver member is formed on the output shaft, the driver member being adapted to mate with said locating recess and engaging into said locating recess.

7. The step down gear train according to claim 2, wherein the worm wheel is made of plastic.

8. The step down gear train according to claim 1, wherein the output shaft is connected to, and integral with, the pinion.

9. The step down gear train according to claim 6, wherein the driver member is connected to, and integral with, the pinion and immediately adjacent said pinion.

10. The step down gear train according to claim 1, wherein the worm wheel is axially offset relative to the cam gear in such a manner that a side face of an electric motor is flush with a front face of the housing portion.

11. The step down gear train according to claim 5, wherein the passageway is large enough to allow the pinion to pass through the passageway.

* * * * *